United States Patent [19]
Zbikowski

[11] 3,730,594
[45] May 1, 1973

[54] WHEEL AND TIRE ASSEMBLY FOR TOY VEHICLES

[75] Inventor: Theodore H. Zbikowski, Mound, Minn.

[73] Assignee: Tonka Corporation, Mound, Minn.

[22] Filed: Apr. 26, 1971

[21] Appl. No.: 137,493

[52] U.S. Cl. ............................ 301/63 PW, 46/221
[51] Int. Cl. .................................................. B60b 5/02
[58] Field of Search .......................... 152/379, 380; 301/63 PW; 46/221

[56] References Cited

UNITED STATES PATENTS

| 1,257,530 | 2/1918 | Putsch | 152/380 |
| 3,387,894 | 6/1968 | Louik | 301/63 PW |
| 2,175,646 | 10/1939 | Replogle | 301/63 PW |
| 3,048,447 | 8/1962 | Klint | 46/221 X |
| 3,360,300 | 12/1967 | Carter | 46/221 X |

FOREIGN PATENTS OR APPLICATIONS

| 965,560 | 6/1957 | Germany | 46/221 |

Primary Examiner—Richard J. Johnson
Attorney—Carlsen, Carlsen & Sturm

[57] ABSTRACT

A wheel and tire assembly for toy vehicles wherein a generally cylindrical wheel of rigid material has a reduced portion projecting concentrically from the outer side thereof and a peripheral groove adjacent the inner side thereof and a tire of resilient material encircling the wheel and having an outer side wall tightly encircling the reduced portion and an annular bead on the inner side of the tire seated in said peripheral groove to prohibit outward axial removal of the tire from the wheel.

4 Claims, 6 Drawing Figures

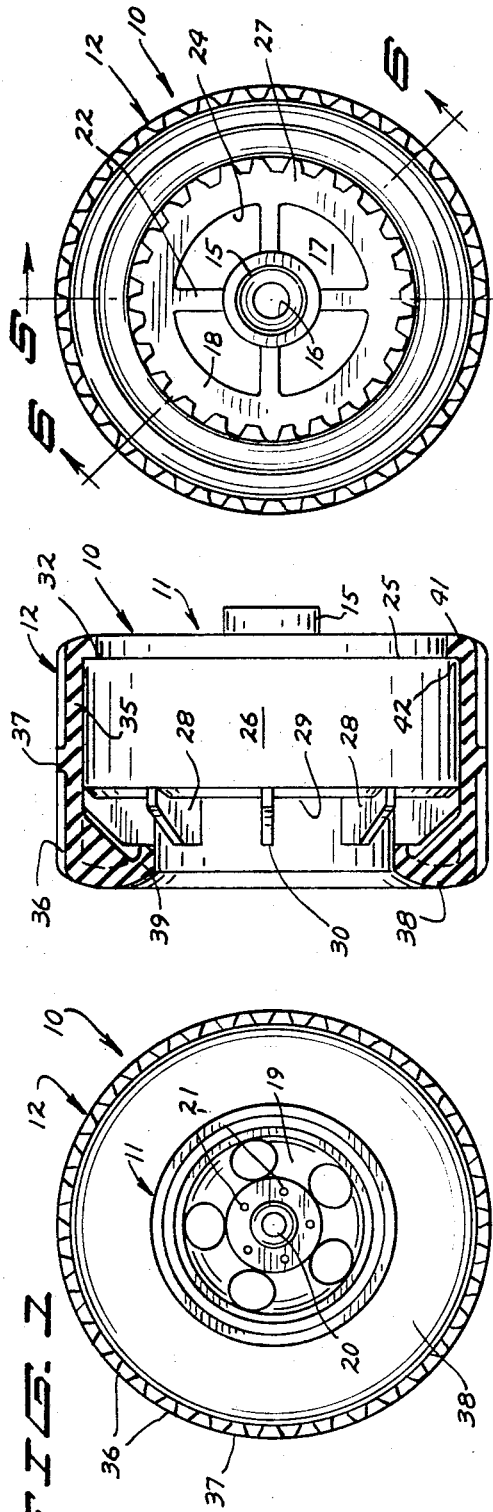
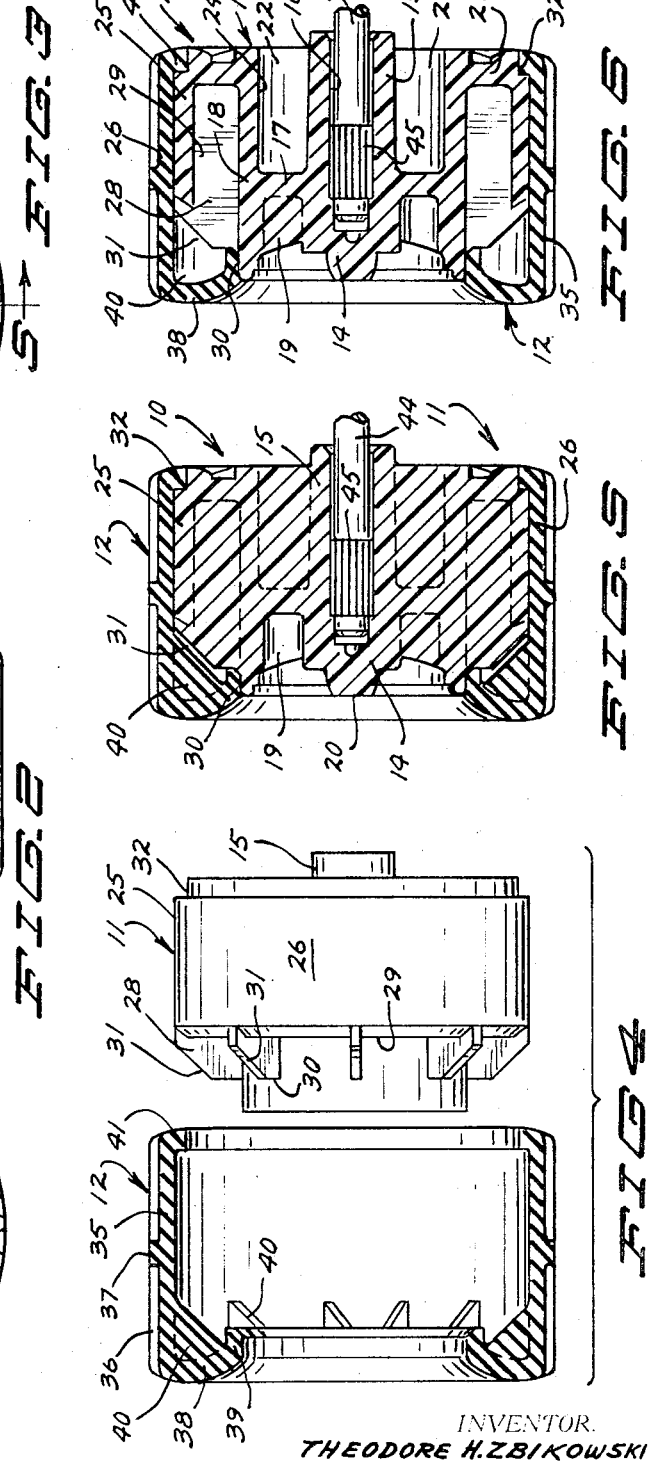

WHEEL AND TIRE ASSEMBLY FOR TOY VEHICLES

BACKGROUND OF THE INVENTION

It is highly desirable that miniature toy vehicles simulate the appearance of their operative full sized counterparts as closely as possible and yet be economically and durably produced and safe in the hands of young children.

Accordingly, manufacturers of tire bearing wheeled toy vehicles such as cars and trucks attempt to simulate the wheel, tire and hub cab of the real thing as closely as possible. This has generally been accomplished in various ways.

In one form of the structure a unitary tire and wheel member of black rubber or plastic material is either fixedly mounted or journaled on the end of an axle and a metal disk mounted concentrically on the outer side of the member to simulate the wheel or hub cap. In another form a wheel is mounted on the end of an axle and is provided with a peripheral groove or tire well in the rim into which the central internal bead of a tire of resilient material may be stretched and seated.

Neither of these structures is completely satisfactory for various reasons. In the first form mentioned the tire and wheel member must be of an undesirably hard or rigid material to assure its retention on the axle without providing a separate bearing insert. If it is of a resilient material it may be easily pulled off of the axle. Also it is not a true wheel and tire assembly. In the second form mentioned and where a resilient material such as rubber or vinyl is used in the tire, a child may generally easily peel it off of the wheel to be lost. Moreover, the latter structure at least does not readily lend itself to the mounting of tires such as sand tires which have a large axial width relative to the diameter thereof.

It is, of course, additionally desirable from a manufacturing standpoint that both the wheel and tire have relatively thin wall structures throughout both to save material and reduce the hardening or setting time after molding.

SUMMARY OF THE INVENTION

An object of the present invention is to provide an improved wheel and tire assembly for miniature toy vehicles wherein a tire of resilient material is actually mounted on a wheel and is so locked in place thereon as to prohibit or restrict removal when the wheel is mounted on the vehicle.

Another object of the invention is to provide a wheel and tire assembly for toy vehicles which more truly simulates the appearance of a real vehicle tire and wheel assembly than those heretofore known.

Still another object of the invention is to provide a wheel and tire assembly for toy vehicles which enables the mounting of a flexible tire on a rigid wheel which has an abnormally large width relative to its diameter and with both components having relatively thin wall structures throughout.

With these and other objects in view the invention broadly comprises a cylindrical cavernous wheel of rigid material having a reduced portion projecting concentrically from the outer side thereof and a peripheral groove extending around the inner edge thereof and a tire of resilient material mounted on the wheel and having an outer side wall tightly encircling the reduced portion and an annular bead on the inner side thereof seated in said groove to lock the tire against axial removal from the wheel.

BRIEF DESCRIPTION OF THE DRAWINGS.

In the drawings:

FIG. 1 is an outer side elevation of the wheel and tire assembly.

FIG. 2 is a front view of the assembly showing the wheel in elevation and the tire in diametrical cross section.

FIG. 3 is an inner side elevation of the assembly.

FIG. 4 is an exploded view of the wheel and tire prior to assembly and with the tire shown in diametrical cross section.

FIG. 5 is a diametrical cross section through the entire assembly taken on line 5—5 of FIG. 3.

FIG. 6 is a section through the assembly taken on line 6—6 of FIG. 3.

DESCRIPTION OF THE PREFERRED EMBODIMENT

Referring now more particularly to the drawings, reference numerals will be used to denote like parts or structural features in the different views. The wheel assembly is designated generally by the number 10 and comprises a wheel 11 of generally cylindrical shape having an annular tire 12 thereon in encircling relation.

Wheel 11 is a generally cylindrical cavernous body that is cast or molded in unitary form of a rigid material such as metal or plastic. At its center a hub 14 is formed at one end of an elongated tubular hub spindle 15 which has an axle receiving socket 16 opening axially toward the inner side of the wheel. A circular wheel wall 17 encircles the medial portion of spindle 15 and supports a cylindrical wheel ring 18 in coaxial radially spaced relation to the spindle. The outer face of wall 17 between hub 14 and ring 18 is configured to simulate a plurality of radially extending spokes 19 and the outer end of hub 14 is configured to simulate the end of an axle at 20 and a series of wheel mounting bolts 21 (FIG. 1). A plurality of circumferentially spaced spoke blades 22 connect the spindle 15 to wheel ring 18 on the inner side of wall 17 leaving recesses 24 therebetween.

An annular rim 25 having a smooth cylindrical outer surface 26 encircles ring 18 in spaced concentric relation and is integrally connected thereto by an inner wheel wall 27. A plurality of circumferentially spaced outer spoke segments 28 extend between ring 18 and rim 25 leaving outwardly opening recesses 29 therebetween. Segments 28 extend outwardly beyond rim 25 and to a point short of the outer edge of wheel ring 18 to form a tire bead seat 30 at the end of the peripheral surface of ring 18. The outer edge of each spoke segment 28 extends normal to the wheel axis a short distance just inside of seat 30 and then angles as at 31 toward rim 25 and over the outside edge thereof to the outer cylindrical surface 26 of the rim.

The rim 25 at the external corner of its junction with inner wheel wall 27 is provided with a peripheral L-shaped seat 32 which opens radially outward and axially toward the inner side of the wheel. This is a tire retention seat as will be shortly more fully described.

Tire 12 is formed of resilient material such as vinyl or rubber and has an annular wall 35 the external cylindrical surface of which may be provided with protruding transversely and circumferentially extending treads denoted respectively at 36 and 37. The outer side wall 38 of the tire curls inwardly from the outer edge of wall 35 and terminates in a bead 39 having an internal diameter equal to the external diameter of ring 18 and the bead seat 30 formed on the outer end thereof. The size and shape of bead 39 is retained by integrally formed gussets 40 extending between walls 35 and 38. A relatively short circumferential bead 41 projects radially inward from the inner edge of wall 35 with the inside face 42 (FIG. 2) thereof lying on a plane perpendicular to the axis of the tire.

In preassembled condition the wheel 11 and tire 12 are in the relative positions shown in FIG. 4. To assemble the wheel is simply forced in an axial direction into the tire. The tapered edges 31 of segments 28 automatically center the wheel in coaxial relation with the tire and distend the bead 41 so that it slides onto and along surface 26 until the wheel is fully inserted into the tire and the bead 41 locks in the L-shaped seat 32. This occurs as the outer end of ring 18 enters into bead 39 which becomes firmly seated in seat 30.

An axle 44 having a serrated enlarged portion 45 is press fit into socket 16 in the spindle 15. Axles 44 with tire and wheel assemblies 10 secured on each end thereof are journaled in transversely extending positions on the toy vehicle to provide rolling support therefor.

When the wheel assembly is mounted on a vehicle particularly under a fender, it is very difficult, if not impossible, for a young child to remove the tire from the wheel as he can only pull on one side of flange 41 and cannot get a good grip on that.

The wheel 11 can be formed to have a very realistic appearance as shown in FIGS. 1 and 3. The wheel is very durable and yet the various recesses in both sides of the wheel render all of the various walls in the wheel structure quite thin for a rapid hardening in the mold to reduce production time. This is also true of the tire 12 although side wall 38 creates the appearance of a relatively thick tire. The thin walls of the tire tend to reduce shrinkage during cooling. Moreover, the components lend themselves well to assembly by automation.

Having now therefore fully illustrated and described my invention, what I claim to be new and desire to protect by Letters Patent is:

1. In a wheel and tire assembly for a miniature toy vehicle, a wheel of rigid material having a cylindrical peripheral surface connecting inner and outer sides of the wheel, the wheel being provided with a continuous groove around said peripheral surface opening toward the inner side thereof and having a diametrically reduced hub portion on the outer side thereof concentric with said peripheral surface and projecting axially outwardly therebeyond, and being provided with radially extending shoulder means spaced axially inwardly from the outer edge of said hub portion an annular tire of resilient material having an interior cylindrical surface adapted to conform to and fit snugly around the peripheral surface of the wheel, said tire having an annular side wall on one side, engaging the outer side of the wheel and having an inner periphery tightly encircling said hub portion and abutting said shoulder means to retain the tire against axially inward movement on said wheel and an inwardly directed annular bead on the other side seated in said groove in the wheel to retain the tire against outward axial movement from the wheel but to permit axial inward movement of said tire onto said wheel, the radial dimension of said side wall being substantially greater than that of the bead whereby to simulate a tire sidewall.

2. The subject matter of claim 1 wherein a plurality of circumferentially spaced gussets integrally connect the side wall to said interior cylindrical surface of the tire.

3. The subject matter of claim 1 wherein the wheel is provided with a plurality of uniform circumferentially spaced segments having outer edges beveled from said peripheral surface toward said reduced portion to aid in assembling the wheel and tire by inserting the wheel axially outward through the bead distending the same and through the tire until the bead seats in the groove.

4. In a wheel and tire assembly for a miniature toy vehicle,
   a. a wheel having a tubular center spindle with a hub on its outer end and an inwardly opening socket in its other end for reception of an axle,
   b. an axially elongated wheel ring concentrically encircling the spindle in spaced relation thereto,
   c. a radially extending plate interconnecting the axially medial portions of the spindle and ring leaving open space on both sides thereof,
   d. a wheel rim having a cylindrical peripheral surface concentrically encircling the wheel ring in spaced relation thereto,
   e. a wheel wall interconnecting the axially inner end portions of the rim and the ring leaving open space on the outer side thereof,
   f. said wheel ring extending axially outward beyond the wheel rim,
   g. said wheel rim having a continuous groove extending therearound and opening through said peripheral surface, and
   h. a tire mounted in encircling relation on the rim and having an annular outer side wall encircling the wheel ring and an annular inner bead seated in said continuous groove.

* * * * *